United States Patent
Sun

(10) Patent No.: US 8,984,231 B2
(45) Date of Patent: Mar. 17, 2015

(54) METHODS AND APPARATUS TO PERFORM ADAPTIVE PRE-FETCH OPERATIONS IN MANAGED RUNTIME ENVIRONMENTS

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 12/645,050

(22) Filed: Dec. 22, 2009

(65) Prior Publication Data

US 2011/0153988 A1 Jun. 23, 2011

(51) Int. Cl.
*G06F 12/00* (2006.01)
*G06F 12/08* (2006.01)

(52) U.S. Cl.
CPC ...... *G06F 12/0862* (2013.01); *G06F 2212/502* (2013.01)
USPC .......................................................... 711/137

(58) Field of Classification Search
USPC .......................................................... 711/137
See application file for complete search history.

(56) References Cited

U.S. PATENT DOCUMENTS

| | | | |
|---|---|---|---|
| 5,761,464 A | 6/1998 | Hopkins | |
| 6,427,184 B1 * | 7/2002 | Kaneko et al. | 711/4 |
| 6,571,302 B1 * | 5/2003 | DeWilde et al. | 710/35 |
| 6,963,954 B1 | 11/2005 | Trehus et al. | |
| 7,139,878 B2 * | 11/2006 | Malik et al. | 711/137 |
| 7,359,890 B1 | 4/2008 | Ku et al. | |
| 7,539,831 B2 | 5/2009 | Sun et al. | |
| 2004/0128449 A1 * | 7/2004 | Osborne et al. | 711/137 |
| 2005/0114289 A1 * | 5/2005 | Fair | 707/1 |
| 2006/0041732 A1 * | 2/2006 | Sun et al. | 711/170 |
| 2007/0006032 A1 * | 1/2007 | Sun | 714/30 |

FOREIGN PATENT DOCUMENTS

| | | |
|---|---|---|
| CN | 1809817 A | 7/2006 |
| EP | 0 752 645 | 1/1997 |

OTHER PUBLICATIONS

European Patent Office, European Search Report, for application serial No. 10252016.0, issued on Mar. 23, 2012, (3 pages).

The State Intellectual Property Office of the People's Republic of China, First Office Action issued in connection with CN Application No. 201010620175.4 on Mar. 25, 2013, (8 pages).

The State Intellectual Property Office of the People's Republic of China, "Third Office Action," issued in connection with Application No. 201010620175.4, Jun. 12, 2014, 12 pages.

The State Intellectual Property Office of the People's Republic of China, "Second Office Action," issued in connection with Application No. 201010620175.4, Nov. 26, 2013, 14 pages.

\* cited by examiner

*Primary Examiner* — Kalpit Parikh

(74) *Attorney, Agent, or Firm* — Hanley, Flight & Zimmerman, LLC

(57) ABSTRACT

Methods and apparatus to perform adaptive pre-fetch operations in managed runtime environments are disclosed herein. An example pre-fetch unit for use with a pre-fetch operation includes a first size function executed by a processor to determine a size of an object associated with a pre-fetch operation; a comparator to compare the size of the object associated with the pre-fetch operation to a first one of a plurality of thresholds; and a fetcher to pre-fetch an amount of memory defined by a first one of a plurality of size definitions corresponding to the first threshold when the comparator determines that the size of the object is less than the first threshold.

17 Claims, 7 Drawing Sheets

METHODS AND APPARATUS TO PERFORM ADAPTIVE PRE-FETCH OPERATIONS IN MANAGED RUNTIME ENVIRONMENTS

FIELD OF THE DISCLOSURE

The present disclosure relates generally to pre-fetch operations and, more particularly, to methods and apparatus to perform adaptive pre-fetch operations in managed runtime environments.

BACKGROUND

The need for increased portability of software programs has resulted in increased development and usage of runtime environments. Portability refers to the ability to execute a given software program on a variety of computer platforms having different hardware and operating systems. A runtime environment may be a runtime system and/or virtual machine. The runtime environment allows software programs to be executed by a target execution platform (e.g., hardware and/or an operating system of a computer system) in a platform-independent manner. In particular, source code instructions are not statically compiled and linked directly into native or machine code for execution by the target execution platform. Instead, the instructions are statically compiled into an intermediate language (e.g., byte-code) and the intermediate language may then be interpreted or subsequently compiled by a just-in-time (JIT) compiler within the runtime environment into native or machine code that can be executed by the target execution platform.

Runtime environments, along with other types of systems, sometimes employ pre-fetch operations when allocating memory for use during execution. While different pre-fetch operations vary in complexity and/or scale, pre-fetching generally includes loading a memory location into a cache and/or other type of rapid access memory before a processor needs the instruction(s) or data stored at that memory location. For instance, pre-fetching can be used in connection with a branch prediction scheme that attempts to predict which memory location the processor will need next based on a probable outcome of a calculation. Pre-fetching is used in additional and alternative types of systems and in connection with additional and alternative processing schemes or techniques.

DETAILED DESCRIPTION

Figure 1:
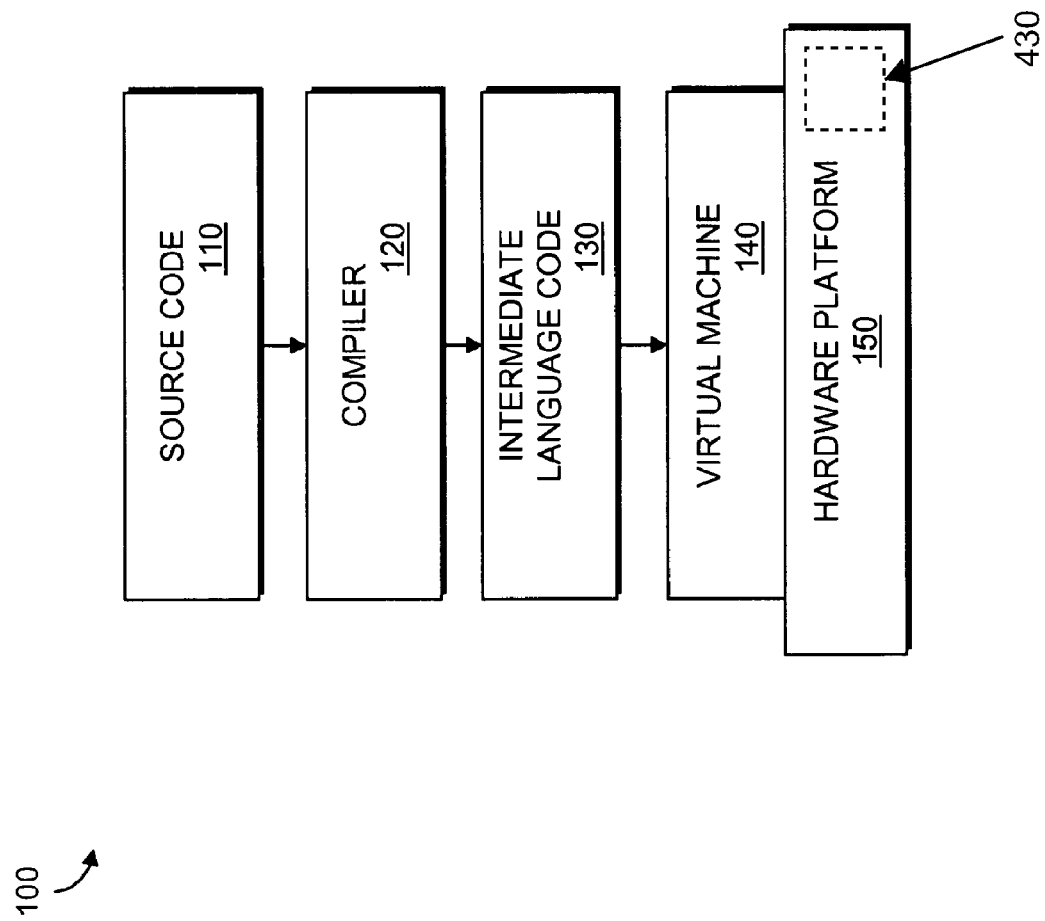
FIG. 1 is a block diagram of an example software compilation and execution system on which the example methods, apparatus, systems, and/or tangible articles of manufacture described herein can be implemented.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Pre-fetching is a technique used in computing systems meant to increase speed at which instructions and/or data is processed. Generally, pre-fetching involves reading, for example, one or more instructions and/or data from a main memory and writing the instruction(s) and/or data to a cache. Conventional systems pre-fetch a fixed amount of memory (e.g., a number of instructions or addresses). In some computing systems, when the system determines or realizes that the fixed amount of pre-fetched memory is too small, the system performs one or more additional pre-fetch operations that retrieve additional, fixed amounts of memory. In some examples, the additional fixed amount of memory pre-fetched in such a secondary pre-fetch is significantly larger than the fixed amount pre-fetched in the primary stage. This approach of incrementally pre-fetching fixed amounts of memory often results in wastes of cache resources, as more memory than is necessary is often pre-fetched. For example, the first fixed amount of memory pre-fetched may be only slightly inadequate (e.g., in terms of an amount of memory needed to be pre-fetched). In such instances, the second fixed amount of memory pre-fetched in the secondary stage (which, in many previous systems, is larger than the amount of memory pre-fetched in the primary stage) may result in a total pre-fetch of nearly double the amount of memory than the amount that was needed. Such an excessive use of cache resources can negatively impact performance of the processor.

To avoid such a waste of cache resources, the example methods, apparatus, systems, and/or articles of manufacture described herein adaptively incorporate a parameter related to an object associated with a pre-fetch operation into a determination of an amount of memory to pre-fetch. In particular, the example methods, apparatus, systems, and/or articles of manufacture described herein determine a size of the object associated with the pre-fetch operation and use that size information to select an amount of memory to pre-fetch in connection with that particular object. Thus, in contrast to conventional systems that reactively pre-fetch fixed additional increments of memory when a primary fixed amount is insufficient, the example methods, apparatus, systems, and/or articles of manufacture described herein proactively vary the amount of memory to be pre-fetched according to, for example, a size of an object associated with the pre-fetch operation. Additionally or alternatively, the example methods, apparatus, systems, and/or articles of manufacture described herein may incorporate a size trend related to recently encountered objects into the determination of the amount of memory to pre-fetch.

As described in greater detail below, the adaptive and/or proactive approach to pre-fetching described herein enables a pre-fetch operation that produces a more accurate (e.g., with respect to an appropriate amount of memory for the object associated with the pre-fetch operation at an appropriate time) pre-fetch and can better handle large objects than conventional or previous pre-fetch units. For example, using the adaptive and/or proactive pre-fetching described herein, the pre-fetch unit of a computing system does not over-fetch memory when large objects are encountered (e.g., identified by the processor in, for example, a branch prediction scheme as related to instruction(s) that should be pre-fetched). Rather, the adaptive and/or proactive pre-fetching described herein enables a pre-fetch unit to load an amount of memory into a cache commensurate with the size of the object associated with the pre-fetch operation. Additional and alternative advantages of the example methods, apparatus, systems, and/or articles of manufacture described herein will be apparent from the description below.

FIGS. 1-5 illustrate an example system on which the adaptive pre-fetch methods, apparatus, systems, and/or articles of manufacture described herein may be implemented. In particular, FIGS. 1-5 illustrate an example managed runtime environment. While FIGS. 1-5 provide an example system on which the adaptive pre-fetching described herein may be implemented, the examples described herein may be implemented on and/or in association with one or more different types of computing systems, platforms, environments, processors, etc.

FIG. 1 illustrates an example software program compilation and execution system 100. The software program compilation and execution system 100 includes a compiler 120 that compiles source code 110 (e.g., Java byte-code or Common Intermediate Language (CIL) code) into an intermediate language code 130. In some examples, the compiler 120 is a software system that is run on a computer system and the intermediate language code 130 is stored in a memory of the computer system.

The software program compilation and execution system 100 includes a virtual machine 140 and a hardware platform 150. The virtual machine 140 further compiles the intermediate language code 130 into native code. In the illustrated example, native code is machine code that is particular to a specific architecture or platform. The virtual machine 140 may be implemented as a software system. In the illustrated example, the virtual machine 140 runs on the hardware platform 150. The virtual machine 140 may be, for example, a Java virtual machine, a small talk runtime system, or other runtime system. Alternatively, the virtual machine 140 may be implemented using other techniques (e.g., as a firmware system).

The hardware platform 150 executes the native code compiled by the virtual machine 140. The hardware platform 150 may be implemented, for example, by a personal computer, a personal digital assistant, a network computer, a server computer, a notebook computer, a workstation, a mainframe computer, a supercomputer, and/or any other electronic system with data processing capabilities. The intermediate language code 130 may be delivered to the hardware platform 150 via a communication link such as, for example, a local area network, the Internet, and/or a wireless communication network. As described in further detail below, the example hardware platform 150 also includes a pre-fetch unit 430 to facilitate the example adaptive pre-fetch operations described herein.

Figure 2:
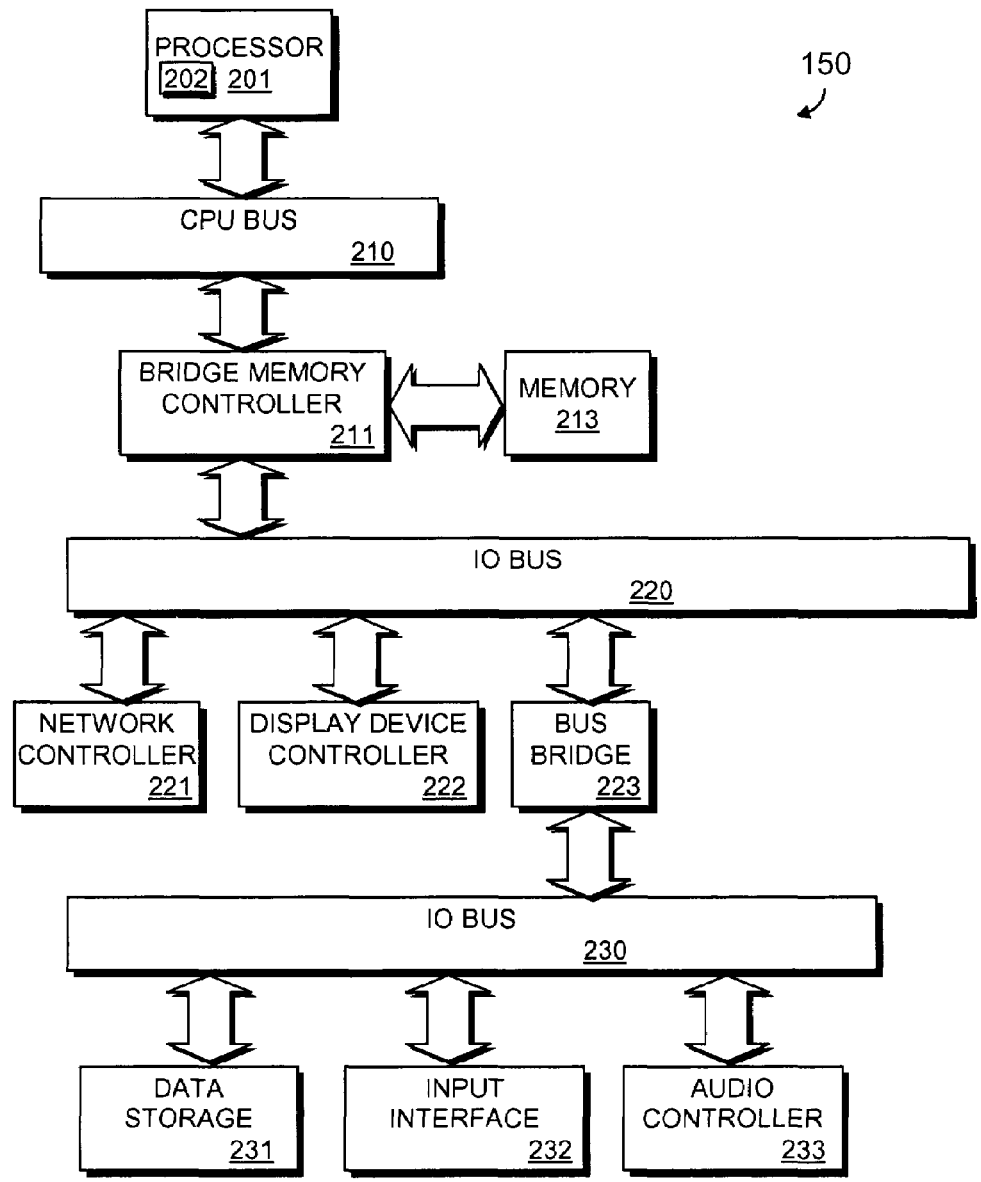
FIG. 2 is a block diagram of an example implementation of the example hardware platform of FIG. 1.

FIG. 2 is a block diagram of an example implementation of the example hardware platform 150 of FIG. 1. The example platform 150 includes a processor 201 that processes data signals. The processor 201 may be a complex instruction set computer microprocessor, a reduced instruction set computing microprocessor, a very long instruction word microprocessor, a processor implementing a combination of instruction sets, and/or other processor device. In some examples, the platform 150 may operate with a plurality of processors. The example processor 201 of FIG. 2 is coupled to a CPU bus 210 that transmits data signals between processor 201 and other components in the platform 150. In some examples, the processor 201 may implement thread-level-parallelism to increase utilization of processor execution resources. By utilizing simultaneous multi-threading technology, multiple threads of software applications may be run simultaneously and/or substantially simultaneously on the processor 201.

The platform 150 includes a memory 213 that is implemented by one or more of a dynamic random access memory device, a static random access memory device, read only memory, and/or other memory device. In the illustrated example, the memory 213 stores instructions and code represented by data signals to be executed by the processor 201. A cache memory 202 resides inside processor 201 that stores data signals stored in memory 213. The cache 202 speeds up memory accesses by the processor 201 by taking advantage of its locality of access. In some examples, the cache 202 resides external to the processor 201. The processor 201 may use a store buffer (not shown) to hold data to be written into the cache memory 202 in preparation for depositing it into memory 213.

A bridge memory controller 211 is coupled to the CPU bus 210 and the memory 213. The bridge memory controller 211 directs data signals between the processor 201, the memory 213, and other components in the platform 150 and bridges the data signals between the CPU bus 210, the memory 213, and a first input output (IO) bus 220.

The first IO bus 220 (e.g., a single bus or a combination of multiple buses) provides communication links between components in the platform 150. In particular, a network controller 221 coupled to the first IO bus 220 is capable of linking the platform 150 to a network of computers (not shown) and supports communication among the machines. Further, a display device controller 222 coupled to the first IO bus 220 allows coupling of a display device (not shown) to the platform 150 and acts as an interface between the display device and the software compilation and execution system 100.

A second IO bus 230 (e.g., a single bus or a combination of multiple buses) also provides communication links between components in the platform 150. In particular, a data storage device 231 is coupled to the second IO bus 230 and may be implemented by a hard disk drive, a floppy disk drive, a CD-ROM device, a flash memory device and/or any type of mass storage device. An input interface 232 is coupled to the second IO bus 230 and may be implemented by, for example, a keyboard and/or mouse controller and/or any other type of input interface. The input interface 232 may be a dedicated device or can reside in another device such as a bus controller or other controller. The input interface 232 allows coupling of an input device to the platform 150 and transmits data signals from an input device to the platform 150. An audio controller 233 coupled to the second IO bus 230 coordinates recording and playing of audio signals. A bus bridge 223 couples the first IO bus 220 to the second IO bus 230 and buffers and bridges data signals between the first IO bus 220 and the second IO bus 230.

Figure 3:
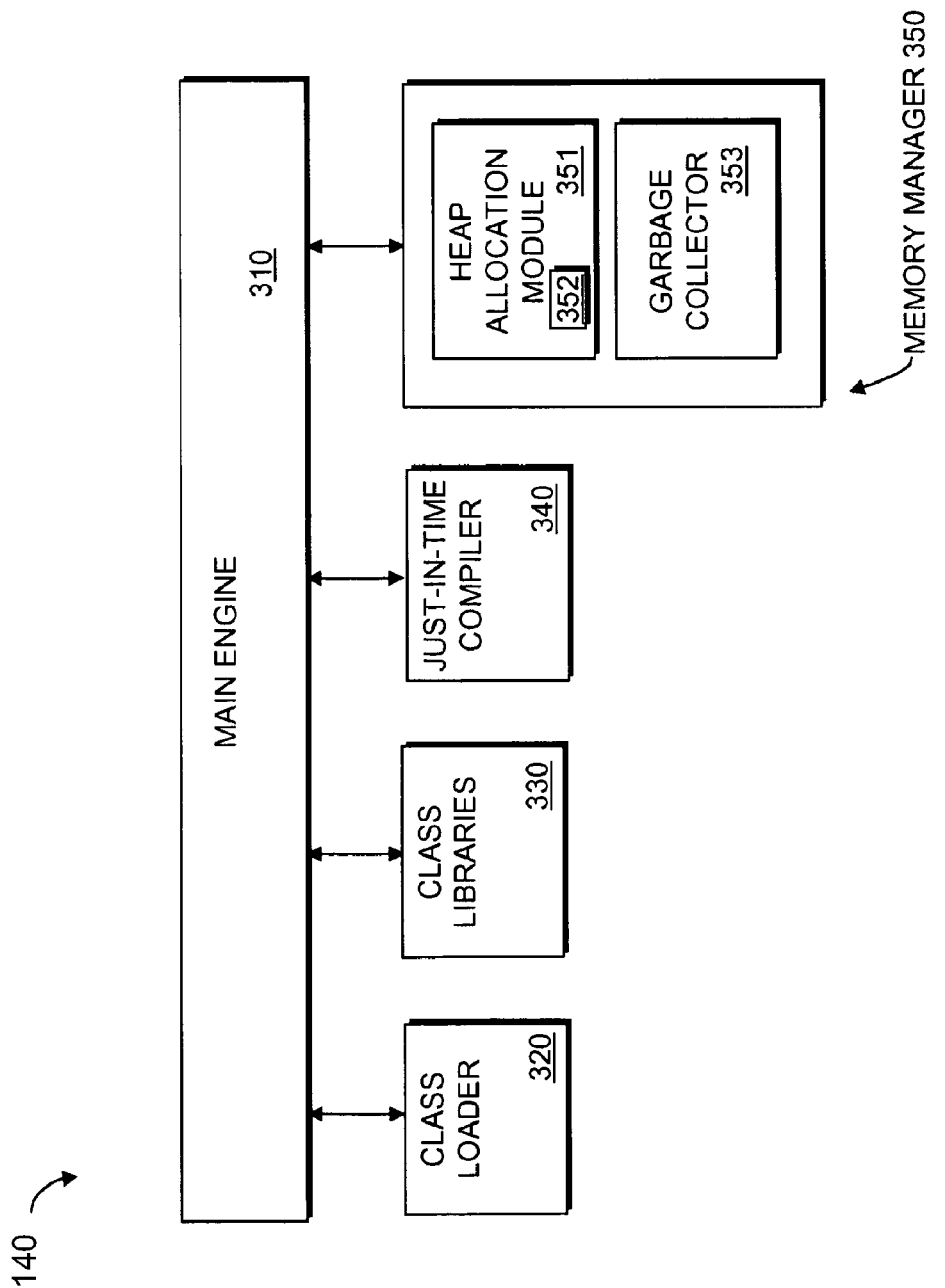
FIG. 3 is a block diagram of an example implementation of the example virtual machine of FIG. 1.

FIG. 3 is a block diagram of an example implementation of the example virtual machine 140 of FIG. 1. The virtual machine 140 includes an example main engine 310 that may be employed as a main core of the virtual machine 140. The example main engine 310 monitors compilation and execution of the intermediate language code, and coordinates use of other modules in the virtual machine 140 when required.

In the illustrated example of FIG. 3, the virtual machine 140 also includes a class loader 320, which loads classes and/or performs additional or alternative functions associated with loading classes. For example, the class loader 320 may also verify loaded classes.

The example virtual machine 140 also includes class libraries 330, which may be used to store shared classes when a program may include more than one type of class, (e.g., application-specific class and shared class).

The example virtual machine 140 of FIG. 3 also includes a just-in-time compiler 340. In the illustrated example of FIG. 3, the just-in-time compiler 340 compiles intermediate language code to generate native or machine code at runtime that is executed by a hardware platform (e.g., the example hardware platform 150 of FIG. 1). Generally, "just-in-time" refers to the just-in-time compiler 340 compiling or translating each method or class when it is used for execution into native code. The just-in-time compiler 340 may also store some compiled native code in a just-in-time in-memory cache (not shown in FIG. 3). In this manner, the virtual machine 140 may re-use native code associated with a previously compiled method or object that is invoked or called more than once.

The example virtual machine 140 also includes a memory manager 350 that can be used to manage a specific memory space within the memory referred to as heap or heap space. The example memory manager 350 of FIG. 3 includes a heap allocation module 351 and a garbage collector 353. In the illustrated example, the heap allocation module 351 is used to allocate objects from the heap space in the memory.

The heap allocation module 351 includes a memory clearing unit 352. In some examples, the memory clearing unit 352 clears a first section in memory when a thread local area (TLA) is created for a thread. The size of the first section is a function of a tunable (e.g., programmable and/or adjustable) clear size and an aspect or parameter of the thread. Additionally, in some examples, the memory clear unit 352 clears a second section in memory in response to an allocation of memory to an object of the thread when the size of the object is greater than an amount of cleared space available in the thread local area. The size of the second section is a function of the size of the object and the tunable clear size.

The garbage collector 353 is typically used to reclaim memory space in the heap used by objects that are no longer referenced by an application or method. Additionally, the garbage collector 353 also may move objects to reduce heap fragmentation.

The main engine 310, class loader 320, class libraries 330, just-in-time compiler 340, and memory manager 350 may be implemented using any known technique or circuitry. Without limitation, other components may also be implemented in the virtual machine 140.

Figure 4:
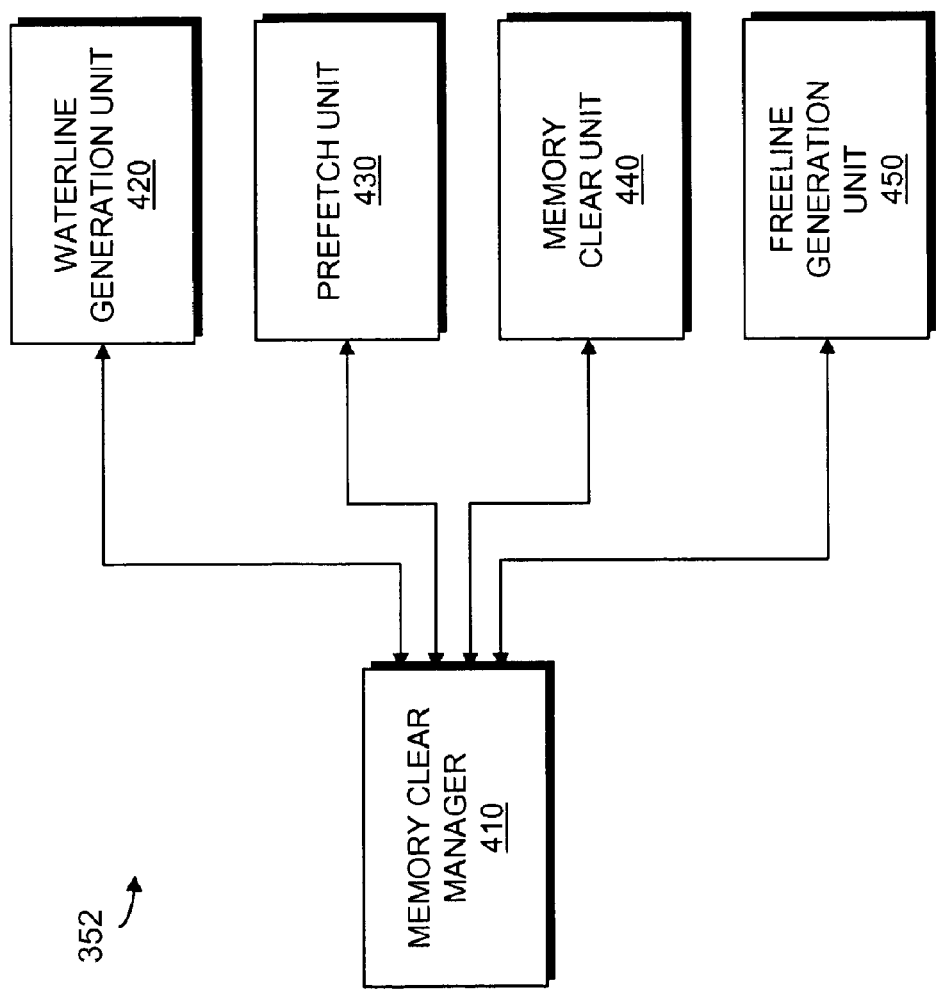
FIG. 4 is a block diagram of an example implementation of the example memory clearing unit of FIG. 3.

FIG. 4 is a block diagram of an example implementation of the example memory clearing unit 352 of FIG. 3. The example memory clearing unit 352 includes a memory clear manager 410 to, in part, manage the operation of the components in the memory clearing unit 352. The memory clearing unit 352 also includes a waterline generation unit 420 that, in part, generates a marker that may be used by the memory clearing unit 352 to determine when to clear a section of memory. The marker, or waterline, may be used to mark an area in a TLA that has been cleared or that is to be cleared. In some examples, an initial waterline is generated upon creation of a TLA for a thread. The initial waterline may be generated in response to a clear size and a parameter of the thread. A parameter of the thread may be, for example, any data in or characteristic of the thread. In some examples, a random or pseudo random function may use a parameter of the thread to determine the initial waterline. Additionally, in some examples, a new waterline is generated when a previously generated waterline is crossed. A waterline is crossed when upon object allocation, a size of an object is greater than a size of cleared space available in the TLA as indicated by the waterline. The new waterline may be generated based on at least the object size and the clear size.

Timing control of memory clears may be adjusted through the generation of the waterline. For example, an initial waterline may be set differently for different threads. This may be done to reduce the collisions of memory write operations during memory clear operations. This may be particularly useful in environments using simultaneous multi-threading technology. In some examples, the clear size used to generate one or more waterlines may be a fixed parameter that is tunable. Further, a random function may be applied to a parameter of the thread to determine a unique location for the thread's initial waterline.

The memory clearing unit 352 includes a pre-fetch unit 430. Generally, the example pre-fetch unit 430 performs a read operation that results in writing a location in memory into a cache. In the illustrated example, the pre-fetch unit 430 performs pre-fetching upon creation of a TLA. An example implementation of the pre-fetch unit 430 is described in greater detail below in connection with FIGS. 5 and 7.

The memory clearing unit 352 includes a memory clear unit 440. The memory clear unit 440 may clear a section in memory, for example, by writing zeros. When available, the memory clear unit 440 clears memory by writing into a store buffer that updates a cache that updates the memory. In the illustrated example of FIG. 4, the memory clear unit 440 clears a first section of memory upon TLA creation and clears a second section of memory upon object allocation when the size of the object is larger than the available cleared space in memory. In such instances, the size of the section of memory cleared is decoupled from the TLA size such that the size of the cleared memory is not the same as the TLA size. A memory clear operation may be configured to have a dimension that is larger than the object size and smaller than the TLA size. The size of a store buffer in a processor may be used to determine the size of the cleared memory.

The memory clearing unit 352 includes a freeline generation unit 450, which generates a freeline. In the illustrated example, a freeline may be used by the memory clearing unit 352 to mark how much memory has been allocated to objects. Additionally, the freeline may be used upon object allocation to determine when to perform pre-fetching and when to clear more memory.

Figure 5:
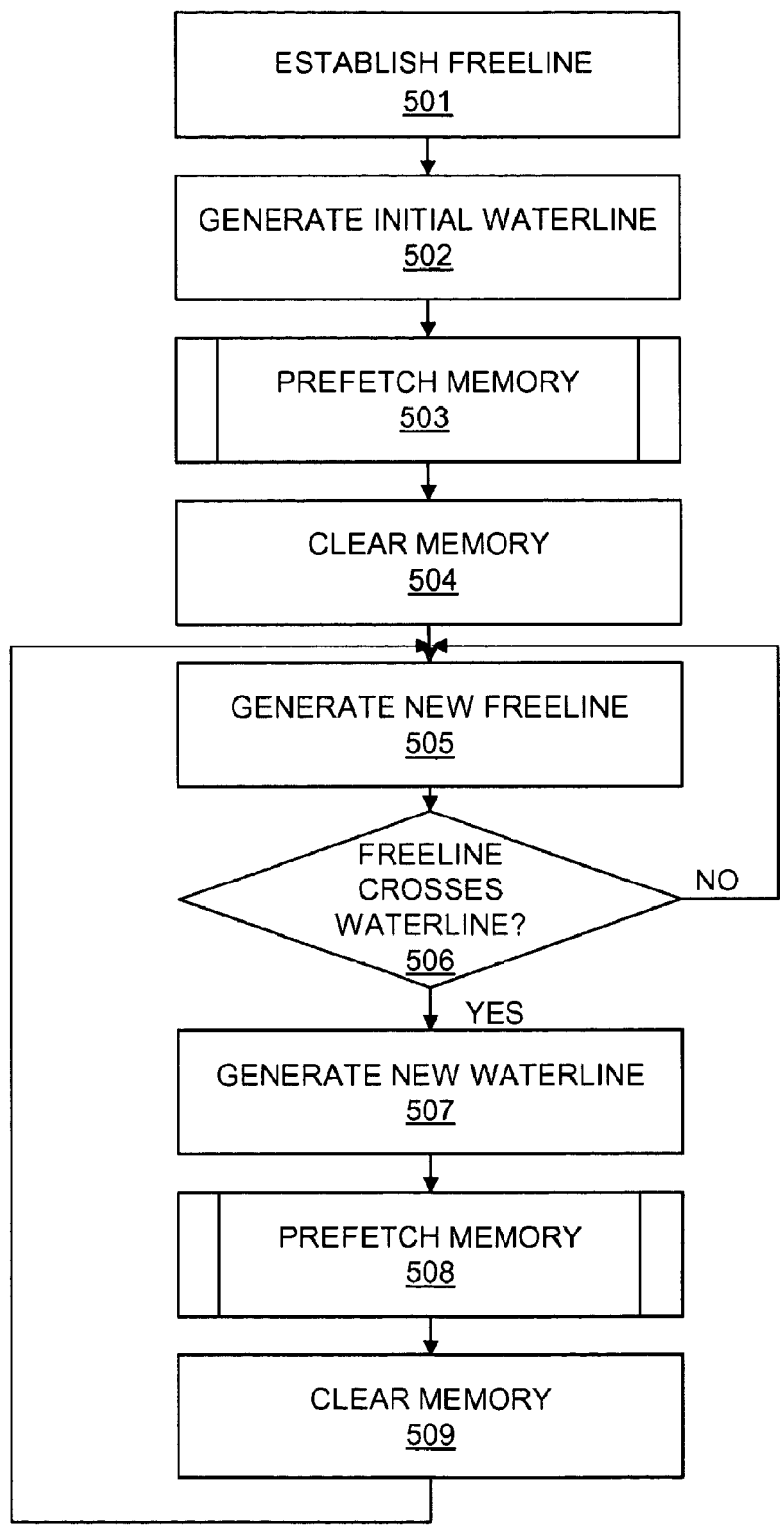
FIG. 5 is a flow diagram representative of an example process that may be carried out using machine readable instructions to implement the example memory clearing unit of FIG. 3.

FIG. 5 is a flow diagram representative of an example process that may be carried out using machine readable instructions to implement the example memory clearing unit of FIGS. 3 and/or 4. In the illustrated example, a freeline is generated upon creation of a TLA for a thread (block 501). The TLA may be managed such that address locations in the TLA are allocated sequentially and the freeline indicates where in the TLA a next address may be allocated. A waterline may be generated to mark an area in the TLA that is to be cleared or that is already cleared (block 502). The generated waterline (block 502) may be referred to as an "initial waterline". In the illustrated example of FIG. 5, the location of the initial waterline is determined based on a tunable or adjustable parameter, such as a clear size, and a function of the thread. In the illustrated example, the locations in memory are pre-fetched in response to the generation of the initial waterline (block 503). The pre-fetching of the memory locations are described in greater detail herein in connection with FIGS. 6 and 7 below.

The memory is cleared to the initial waterline generated by, for example, writing a store buffer that updates a cache (block 504). In the illustrated example, a new freeline is then generated upon allocation of a new object (block 505). The location of the new freeline may be determined from a location of a previously generated freeline and size of the new object. If the new freeline crosses the waterline (e.g., when the size of the new object is larger than the size of available cleared space in the TLA) (block 506), a new waterline is generated (block 507). If the new freeline does not cross the waterline, then control returns to block 505. In the illustrated example, the location of the new waterline is determined from a location of the new freeline generated at block 505 and a clear size parameter.

In the illustrated example, after the generation of the new waterline (block 507), locations in memory are pre-fetched (block 508). The pre-fetching of the memory locations are described in greater detail in connection with FIGS. 6 and 7 below.

In the illustrated example, the memory is cleared to the new waterline generated by, for example, writing a store buffer that updates a cache (block 509).

In some examples, the following pseudo code may be used to implement the example machine readable instructions represented by blocks 501-504.

```
Set freeline = TLA start;
    Upon TLA creation: tla-> init_waterline = clear_size +
    gen_init_waterline(thread);
    prefetchnta(tla_start, init_waterline +pref_dist);
    clear_memory(tla_start, init_waterline);
``` where 0<gen_init_waterline(thread)<clear_size; and the generated value is a function of the thread.

In some examples, the following pseudo code may be used to implement the example machine readable instructions represented by blocks 505-509.

```
Upon object allocation:
    new_freeline = freeline + object size;
    If (object_size + free_line > waterline) {
        new_waterline = new_freeline + clear_size;
        prefetchnta(new_freeline, new_waterline + pref_dist);
        clear_memory(waterline, new_waterline);}
```

Figure 6:
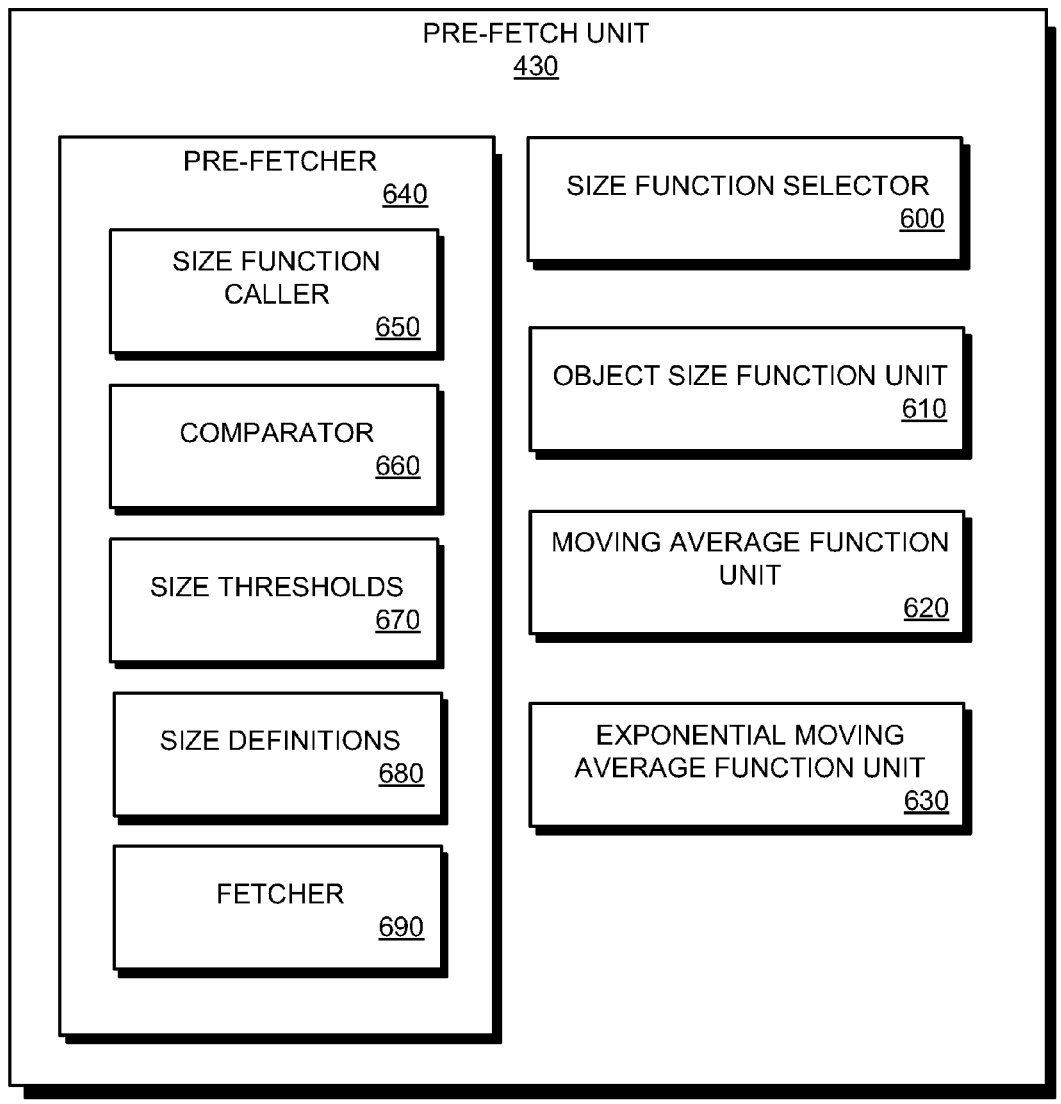
FIG. 6 is a block diagram of an example implementation of the example pre-fetch unit of FIG. 4.

FIG. 6 is a block diagram illustrating an example implementation of the example pre-fetch unit 430 of FIG. 4. While described herein in connection with the example system of FIG. 1-5, the example pre-fetch unit 430 may be implemented in additional or alternative systems, environments, and/or in connection with different systems, environments, techniques, etc.

The example pre-fetch unit 430 of FIG. 6 includes a size function selector 600, an object size function unit 610, a moving average function unit 620, an exponential moving average function unit 630, and a pre-fetcher 640 including a size function caller 650, a comparator 660, size thresholds 670, size definitions 680, and a fetcher 690. While an example manner of implementing the pre-fetch unit 430 of FIG. 4 has been illustrated in FIG. 6, one or more of the elements, processes and/or devices illustrated in FIG. 6 may be combined, divided, re-arranged, omitted, eliminated and/or implemented in any other way. Further, any or all of the example size function selector 600, the example object size function unit 610, the example moving average function unit 620, the example exponential moving average function unit 630, the example pre-fetcher 640, the example size function caller 650, the example comparator 660, the example size thresholds 670, the example size definitions 680, the example fetcher 690 and/or, more generally, the example pre-fetch unit 430 of FIG. 6 may be implemented by hardware, software, firmware and/or any combination of hardware, software and/or firmware. Thus, for example, any of the example size function selector 600, the example object size function unit 610, the example moving average function unit 620, the example exponential moving average function unit 630, the example pre-fetcher 640, the example size function caller 650, the example comparator 660, the example size thresholds 670, the example size definitions 680, the example fetcher 690, and/or, more generally, the example pre-fetch unit 430 of FIG. 6 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example size function selector 600, the example object size function unit 610, the example moving average function unit 620, the example exponential moving average function unit 630, the example pre-fetcher 640, the example size function caller 650, the example comparator 660, the example size thresholds 670, the example size definitions 680, the example fetcher 690, and/or, more generally, the example pre-fetch unit 430 of FIG. 6 are hereby expressly defined to include a tangible machine readable medium such as a memory, DVD, CD, etc. storing the software and/or firmware. Further still, the example pre-fetch unit 430 of FIG. 6 may include one or more elements, processes and/or devices in addition to, or instead of, those illustrated in FIG. 6, and/or may include more than one of any or all of the illustrated elements, processes and devices.

The example pre-fetch unit 430 described herein enables an adaptive or proactive pre-fetch operation that produces a more accurate pre-fetch and can better handle large objects (e.g., by not over-fetching memory when large objects are encountered) than conventional or previous pre-fetch units (e.g., pre-fetch units that pre-fetch a fixed amount of memory). In particular, in contrast to conventional or previous pre-fetch units, the example pre-fetch unit 430 of FIG. 6 avoids over-fetching memory when large objects are encountered. As described above, conventional or previous pre-fetch units pre-fetch a fixed amount of memory (e.g., more than once when too small of an amount of memory is initially pre-fetched).

Conversely, the example pre-fetch unit 430 of FIG. 6 incorporates a size of an object associated with a pre-fetch operation into a determination of an amount of memory to pre-fetch. In some examples, the example pre-fetch unit 430 incorporates an object size trend related to recently pre-fetched objects into the determination of the amount of memory to pre-fetch. In doing so, the example pre-fetch unit 430 pre-fetches an amount of memory commensurate with the size of the associated object. The resulting pre-fetch operation is more accurate and makes better use of valuable cache resources. Additional and alternative advantages of the example pre-fetch unit 430 will be apparent from the examples described herein.

As shown in FIG. 6, the example pre-fetch unit 430 includes a plurality of functions capable of determining the object size to be adaptively incorporated into the determination of the amount of memory to pre-fetch. In particular, the example pre-fetch unit 430 includes the object size function unit 610, the moving average function unit 620, and the exponential moving average function unit 630. The pre-fetch unit 430 may include additional or alternative functions and/or units capable of returning additional or alternative information related to the object size associated with the pre-fetch operation (e.g., the object involved in the pre-fetch operation and/or other objects related thereto). To select one (or more) of the functions implemented by the size function unit 610, the moving average function unit 620, and/or the exponential moving average function unit 630, the example pre-fetch unit 430 employs the size function selector 600. The example size function selector 600 can be configured by a programmer, a designer, a technician, and/or any other type of user, according to a schedule, randomly, and/or via any suitable technique to select one of the functions of the units 610, 620, and 630 to be used in the determination of the amount of memory to pre-fetch. For example, the size function selector 600 may be configured to select the object size function unit 610 during a first type of runtime operation, the moving average function unit 620 during a second type of runtime operation, and the exponential moving average function unit 630 during a third type of runtime operation. The different types of runtime operations may correspond to, for example, different types of instructions or classes being processed by the virtual machine 140. The size function selector 600 may be configured to select one of the function units 610, 620, and 630 based on additional or alternative factors.

The example object size function unit 610 of FIG. 6 implements a function that returns the size of the object that triggered the pre-fetch allocation request. In the illustrated example, the following pseudo code may be used to represent the function implemented by the object size function 610:

Objectsize(curr)=object.size.

The example moving average function unit 620 of FIG. 6 implements a function that returns an N-period moving average indicative of the sizes of objects associated with recent pre-fetch operations. In the illustrated example, the following pseudo code may be used to represent the function implemented by the moving average function unit 620:

Objectsize(curr)=(object.size+$N$*Objectsize(prev))/($N$+1), where '$N$' is a programmable or adjustable variable set to define a range of previous objects (e.g., the fifty (50) most recent object) to be considered in calculating the moving average of object sizes.

The example exponential average function unit 630 of FIG. 6 implements a function that returns an exponential moving average indicative of the sizes of objects associated with recent pre-fetch operations. In the illustrated example, the following pseudo code may be used to represent the function implemented by the exponential moving average function unit 630:

Objectsize(curr)=(($N$−1)*Objectsize(prev)+object.size)/$N$, where '$N$' is a programmable or adjustable variable set to define a range of previous objects (e.g., the fifty (50) most recent object) to be considered in calculating the moving average of object sizes.

The example size function caller 650 receives a selection of one of the size function units 610, 620, and 630 from the size function selector 600. For example, the size function selector 600 may select the object size function unit 610 for a particular pre-fetch operation. In such instances, the example size function caller 650 invokes the object size function unit 610 when the object size to be considered in the adaptive approach described herein is needed. In the illustrated example, the object size function unit 610 returns the size of the current object that triggered the pre-fetch operation (e.g., in response to a creation of a TLA). Alternatively, when the size function selector 600 selects one of the moving average function unit 620 and the exponential moving average function unit 630, the size function caller 650 receives information related to the current object and objects associated with previous pre-fetch operations from the selected function in response to an invocation thereof.

The example size function caller 650 conveys the object size information received from the selected one of the size function units 610, 620, and 630 to the example comparator 660 of FIG. 6 (e.g., from the size function caller 650). In the illustrated example, the comparator 660 also receives information from the size thresholds 670.

The thresholds 670 may be programmable or adjustable sizes configured by, for example, a programmer, technician, designer, etc. corresponding to different sizes of objects (e.g., objects typically associated with pre-fetch operations). The thresholds 670 incrementally increase is value, starting with a first threshold reflective of a typically-sized object associated with pre-fetch operations (e.g., a size associated with an average object). As described below, the example thresholds 670 are used to determine a size of the object associated with a current pre-fetch operation.

The example comparator 660 of FIG. 6 compares the object size information received from the size function caller 650 to the first one of the thresholds 670. When the object size information is greater than or equals (e.g., in terms of memory size) the first one of the thresholds 670, the comparator 660 proceeds to compare the object size information with a second one of the thresholds 670, which is incrementally greater than the first one of the thresholds 670. If the object size information is greater than or equal to the second one of the thresholds 670, the comparator 660 proceeds to compare the object size information with a third one of the thresholds 670, which is incrementally greater than the second one of the thresholds 670. The example comparator 660 of FIG. 6 continues to compare the object size information with the thresholds 670 in this manner until the object size information is less than one of the thresholds 670. For instance, when the comparator 660 determines that the object associated with the pre-fetch operation is less than the third one of the thresholds 670 and greater than the second one of the thresholds 670, the pre-fetch unit 430 is aware of the size of the object (e.g., within a certain range defined by the increment at which the third one of the thresholds 670 is greater than the second one of the thresholds 670).

In response to determining that the object size information is less than one of the thresholds 670, the comparator 660 identifies one of the size definitions 680 as corresponding to that one of the thresholds 670. Each of the example size definitions 680 of FIG. 6 defines a size of memory to be pre-fetched. In the illustrated example, each of the size definitions 680 corresponds to one of the size thresholds 670.

When the comparator 660 determines that the object size information is less than, for example, the first one of the thresholds 670, a first one of the size definitions 680 corresponding to the first one of the thresholds 670 is identified. Thus, the example pre-fetch unit 430 can identify an amount of memory to be pre-fetched 430 corresponding to the first size definition 680. Due to the calculation(s) described above (e.g., the comparisons made by the comparator 660), the identified amount of memory will include enough memory to accurately pre-fetch the information corresponding to the object associated with the pre-fetch operation (e.g., as the size of the object was determined to be less than a threshold corresponding to the identified size definition).

When the example fetcher 690 of FIG. 6 determines which one of the size definitions 680 was identified in the comparison process described above, the example fetcher 690 pre-fetches the amount of memory defined in the identified one of the size definitions 680. Thus, the amount of memory to be pre-fetched by the example pre-fetch unit 430 is adaptively based on the size of the object associated with the pre-fetched operation and/or an object size trend associated with recent pre-fetches.

This adaptive approach to pre-fetching makes efficient use of hardware cache resources by, for example, avoiding unnecessarily large pre-fetches when the system encounters large objects and improving the accuracy of the pre-fetch operation. The size of the increments in which the size thresholds 670 and, thus, the size definitions 680 differ can be tuned or adjusted to vary the precision of the pre-fetch unit 430. In particular, smaller increments will reduce the variance between the object size (e.g., as retrieved by the size function caller 650) and the certain one of the size thresholds 670 determined to be greater than the retrieved object size. However, these smaller increments are likely to result in a greater number of calculations, taking a longer period of time. Depending on, for example, the implementation of the pre-fetch unit 430, time may be sacrificed for better precision in some examples, while precision is sacrificed for time in some examples.

Figure 7:
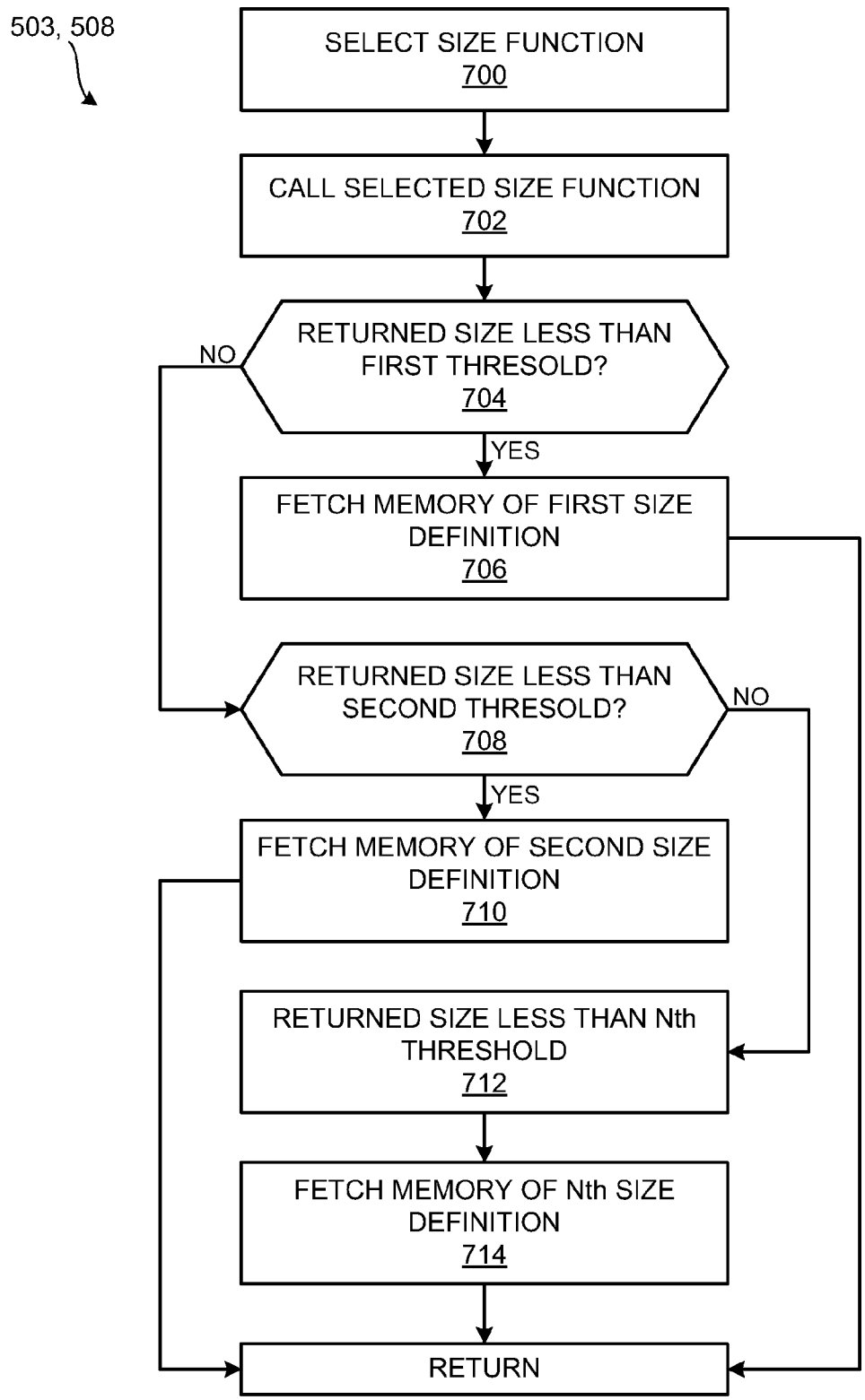
FIG. 7 is a flow diagram representative of an example process that may be carried out using machine readable instructions to implement the example pre-fetch unit of FIGS. 4 and/or 6.

FIG. 7 is a flow diagram representative of example machine readable instructions that may be executed to implement the example pre-fetch unit 430 of FIGS. 4 and/or 6. Moreover, the example flow diagram of FIG. 7 can be used to implement block 503 and/or block 508 of FIG. 5. For example, the pre-fetch operation described above in connection with block 503 of FIG. 5 can begin with a selection of a size function in the example of FIG. 7 (block 700). In the illustrated example, the size function selector 600 (FIG. 6) selects one of the object size function unit 610 (FIG. 6), the moving average function unit 620 (FIG. 6), and the exponential moving average unit 630 (FIG. 6). Some examples include additional or alternative functions capable of returning additional or alternative information regarding object size that can be utilized in the determination of an amount of memory to pre-fetch.

The example size function caller 650 (FIG. 6) of the example pre-fetcher 640 (FIG. 6) calls the size function selected by the size function selector 600 (block 702). The selected size function returns information related to the current object (e.g., the object associated with the current pre-fetch operation) and/or other related objects (e.g., objects associated with recent pre-fetches) depending on which of the size functions the size function selector 600 selected. As described above, the adaptive approach of dynamically using the returned object size information in the determination of an amount of memory to pre-fetch enables a pre-fetch operation that produces a more accurate pre-fetch and can better handle large objects than conventional or previous pre-fetch units (e.g., pre-fetch units that pre-fetch a fixed amount of memory).

The comparator 660 (FIG. 6) compares the object size information retrieved by the size function caller 600 to a first one of the size thresholds 670 (FIG. 6) (block 704). When the object size information is less than (e.g., in terms of memory size) the first one of the thresholds 670 (block 704), the comparator 660 identifies one of the size definitions 680 (FIG. 6) as corresponding to the first one of the thresholds 670 and the fetcher 690 pre-fetches the amount of memory defined in the identified one of the size definitions 680 (block 706). In the illustrated example, control then returns to block 504 of FIG. 5.

Referring back to block 704, when the comparator 660 determines that the object size information retrieved by the size function caller 650 is greater than or equals the first one of the thresholds 670, control passes to block 708 and the comparator 660 compares the object size information with a second one of the thresholds 670 (block 708). The second one of the thresholds 670 is incrementally greater than the first one of the thresholds 670. When the object size information is less than (e.g., in terms of memory size) the second one of the thresholds 670 (block 704), the comparator 660 identifies one of the size definitions 680 as corresponding to the second one of the thresholds 670 and the fetcher 690 pre-fetches the amount of memory defined in the identified one of the size definitions 680 (block 710). In the illustrated example, control then returns to block 504 of FIG. 5.

Referring back to block 708, when the comparator 660 determines that the object size information retrieved by the size function caller 650 is greater than or equals the second one of the thresholds 670, control passes to block 712 and the comparator 660 compares the object size information with an Nth one of the thresholds 670 (block 712). That is, the comparator 660 compares the object size information with incrementally greater thresholds 670 until one of the thresholds 670 is less than the object size. In response, the fetcher 690 pre-fetches the amount of memory defined in one of the size definitions 680 identified as corresponding to that threshold (block 714). Thus, the amount of memory to be pre-fetched by the example pre-fetch unit 430 is based on the size of the object associated with the pre-fetched operation and/or an object size trend associated with recent pre-fetches The example processes of FIGS. 5 and/or 7 may be performed using a processor, a controller and/or any other suitable processing device. For example, the example processes of FIGS. 5 and/or 7 may be implemented in coded instructions stored on a tangible medium such as a flash memory, a read-only memory (ROM) and/or random-access memory (RAM) associated with a processor (e.g., the example processor 201 discussed above in connection with FIG. 2). Alternatively, some or all of the example processes of FIGS. 5 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 5 and/or 7 may be implemented manually or as any combination(s) of any of the foregoing techniques, for example, any combination of firmware, software, discrete logic and/or hardware. Further, although the example processes of FIGS. 5 and/or 7 are described with reference to the sequence diagram of FIGS. 5 and/or 7, other methods of implementing the processes of FIGS. 5 and/or 7 may be employed. For example, the order of execution of the operations may be changed, and/or some of the operations described may be changed, eliminated, sub-divided, or combined. Additionally, any or all of the example processes of FIGS. 5 and/or 7 may be performed sequentially and/or in parallel by, for example, separate processing threads, processors, devices, discrete logic, circuits, etc.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of pre-fetching, the method comprising:
    calling a size function to be executed by a processor to determine a size of an object that triggered a pre-fetch operation;
    identifying a smallest one of a plurality of thresholds that is greater than the size of the object;
    selecting, for the pre-fetch operation, a size definition corresponding to the identified threshold; and
    pre-fetching an amount of stored data defined by the selected size definition corresponding to the identified threshold.

2. A method as defined in claim 1, wherein identifying the smallest one of the plurality of thresholds that is greater than the size of the object comprises:
    comparing the size of the object to a first one of the thresholds; and
    when the size of the object is greater than the first threshold, comparing the size of the object to a second one of the plurality of thresholds, wherein the second threshold is greater than the first threshold.

3. A method as defined in claim 2, wherein:
    the selected size definition corresponds to the first threshold when the size of the object is less than the first threshold; and
    the selected size definition corresponds to the second threshold when the size of the object is less than the second threshold and greater than the first threshold, wherein the second size definition defines a greater amount of data than the first size definition.

4. A method as defined in claim 1, wherein the size function determines a moving average representative of sizes of other objects associated with other pre-fetch operations preceding the current pre-fetch operation.

5. A method as defined in claim 1, wherein the size function determines an exponential moving average representative of sizes of other objects associated with other pre-fetch operations preceding the current pre-fetch operation.

6. A method as defined in claim 1, wherein the pre-fetch operation is triggered by a creation of a thread local area associated with a memory allocation operation.

7. A non-transitory machine accessible storage device or storage disc comprising instructions that, when executed, cause a machine to at least:
    call a size function to determine a size of an object that triggered a pre-fetch operation;
    identify a smallest one of a plurality of thresholds that is greater than the size of the object;
    select, for the pre-fetch operation, a size definition corresponding to the identified threshold; and
    pre-fetch an amount of data from a memory, the amount of data defined by the selected size definition corresponding to the identified threshold.

8. A storage device or storage disc as defined in claim 7 having instructions stored thereon that, when executed, cause a machine to identify the smallest one of the plurality of thresholds that is greater than the size of the object by:
    comparing the size of the object to a first one of the plurality of thresholds; and
    when the size of the object is greater than the first threshold, comparing the size of the object to a second one of the plurality of thresholds, wherein the second threshold is greater than the first threshold.

9. A storage device or storage disc as defined in claim 8, wherein:
    the selected size definition corresponds to the first threshold when the size of the object is less than the first threshold; and
    the selected size definition corresponds to the second threshold when the size of the object is less than the second threshold and greater than the first threshold, wherein the second size definition defines a greater amount of data than the first size definition.

10. A storage device or storage disc as defined in claim 7, wherein the size function determines a moving average representative of sizes of other objects associated with other pre-fetch operations preceding the current pre-fetch operation.

11. A storage device or storage disc as defined in claim 7, wherein the size function determines an exponential moving average representative of sizes of other objects associated with other pre-fetch operations preceding the current pre-fetch operation.

12. A storage device or storage disc as defined in claim 7, wherein the pre-fetch operation is triggered by a creation of a thread local area associated with a memory allocation operation.

13. A pre-fetch unit to execute a pre-fetch operation, comprising:
    a size function unit to determine a size of an object that triggered a pre-fetch operation;
    a comparator to:
        identify a smallest one of a plurality of thresholds that is greater than the size of the object; and
        select, for the pre-fetch operation, a size definition corresponding to the threshold identified by the comparator; and
    a fetcher to pre-fetch an amount of data from a memory, the amount of data defined by the selected size definition corresponding to the threshold identified by the comparator, at least one of the first size function unit, the comparator, or the fetcher is implemented via a logic circuit.

14. A pre-fetch unit as defined in claim 13, wherein the comparator is to identify the smallest one of the plurality of thresholds that is greater than the size of the object by:
    comparing the size of the object to a first one of the plurality of thresholds; and
    when the size of the object is greater than the first threshold, comparing the size of the object to a second one of the plurality of thresholds, the second threshold being greater than the first threshold.

15. A pre-fetch unit as defined in claim 14, wherein:
    the selected size definition corresponds to the first threshold when the size of the object is less than the first threshold; and
    the selected size definition corresponds to the second threshold when the comparator determines that the size of the object is less than the second threshold and greater than the first threshold, wherein the second size definition defines a greater amount of data than the first size definition.

16. A pre-fetch unit as defined in claim 15, wherein the size function unit is to determine a moving average representative of sizes of other objects associated with other pre-fetch operations preceding the current pre-fetch operation.

17. A pre-fetch unit as defined in claim 15, wherein the size function unit is to determine an exponential moving average representative of sizes of other objects associated with other pre-fetch operations preceding the current pre-fetch operation.

* * * * *